United States Patent [19]
Dobbelstein

[11] Patent Number: 5,881,269
[45] Date of Patent: Mar. 9, 1999

[54] SIMULATION OF MULTIPLE LOCAL AREA NETWORK CLIENTS ON A SINGLE WORKSTATION

[75] Inventor: Steven Lawrence Dobbelstein, Austin, Tex.

[73] Assignee: International Business Machines Corporation, Armonk, N.Y.

[21] Appl. No.: 724,124

[22] Filed: Sep. 30, 1996

[51] Int. Cl.$^6$ .............................. G06F 9/22; G06F 9/455
[52] U.S. Cl. ................... 395/500; 395/200.33; 395/682; 395/685; 364/578
[58] Field of Search ................................ 395/500, 200.04, 395/200.11, 200.2, 200.01, 680, 682, 200.33, 200.78, 685; 370/85.13, 85.2, 60, 94.1

[56] References Cited

U.S. PATENT DOCUMENTS

| | | | |
|---|---|---|---|
| 4,644,468 | 2/1987 | Doster et al. | 364/200 |
| 4,644,470 | 2/1987 | Feigenbaum et al. | 364/200 |
| 4,718,005 | 1/1988 | Feigenbaum et al. | 370/94 |
| 4,744,084 | 5/1988 | Beck et al. | 371/23 |
| 4,903,218 | 2/1990 | Longo et al. | 364/521 |
| 4,937,827 | 6/1990 | Beck et al. | 371/23 |
| 5,088,058 | 2/1992 | Salsburg | 364/578 |
| 5,353,243 | 10/1994 | Read et al. | 364/578 |
| 5,381,534 | 1/1995 | Shi | 395/200 |
| 5,408,602 | 4/1995 | Giokas et al. | 395/157 |
| 5,544,318 | 8/1996 | Schmitz et al. | 395/200.04 |
| 5,596,579 | 1/1997 | Yasrebi | 395/678 |
| 5,619,650 | 4/1997 | Bach et al. | 395/200.01 |

OTHER PUBLICATIONS

Petriu et al., "Analytic Performance Estimation of Client Server Systems with Multi-threaded Clients", IEEE, 1994, pp. 96–100.

Govindarajan et al., "Design and Performance Evaluation of a Multithreaded Architecture", IEEE, 1995, pp. 298–307.

*Primary Examiner*—Kevin J. Teska
*Assistant Examiner*—Thai Phan
*Attorney, Agent, or Firm*—Jeffrey S. LaBaw

[57] ABSTRACT

Multiple users are emulated in a network environment by means of a multithreaded process in a client workstation. A plurality of client threads and associated network request queues are provided. Each client thread emulates a user in the network environment. A series of network requests is to a first network request queue associated with a first client thread. A harvester thread receives network traffic from a network application such as a redirector in the client workstation. The harvester filters the network traffic to assemble network requests and corresponding network responses. Once assembled, the network requests and network responses are placed in the first network request queue. Each of the series of network requests to a server in the network environment by the first client thread. The first client thread sequentially send each of the series of network requests to a next network request queue as each of the series of network requests are sent to the server. The process continues with each of the plurality of threads sequentially sending the network requests to the server and sequentially sending the network request to the next network request queue so that a plurality of users are emulated.

22 Claims, 10 Drawing Sheets

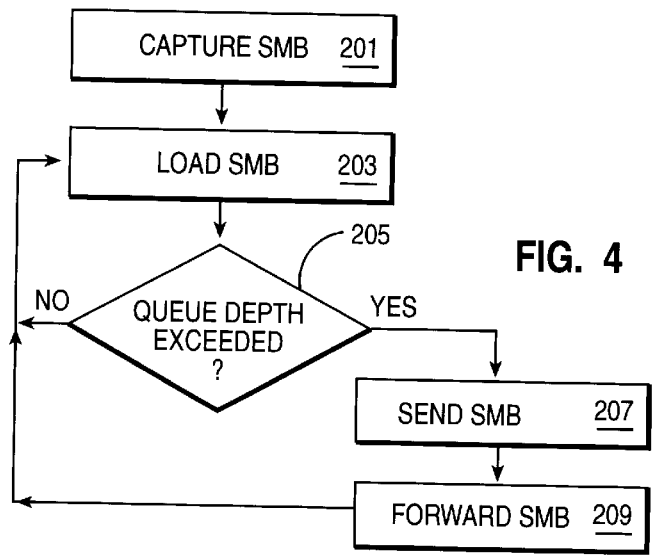
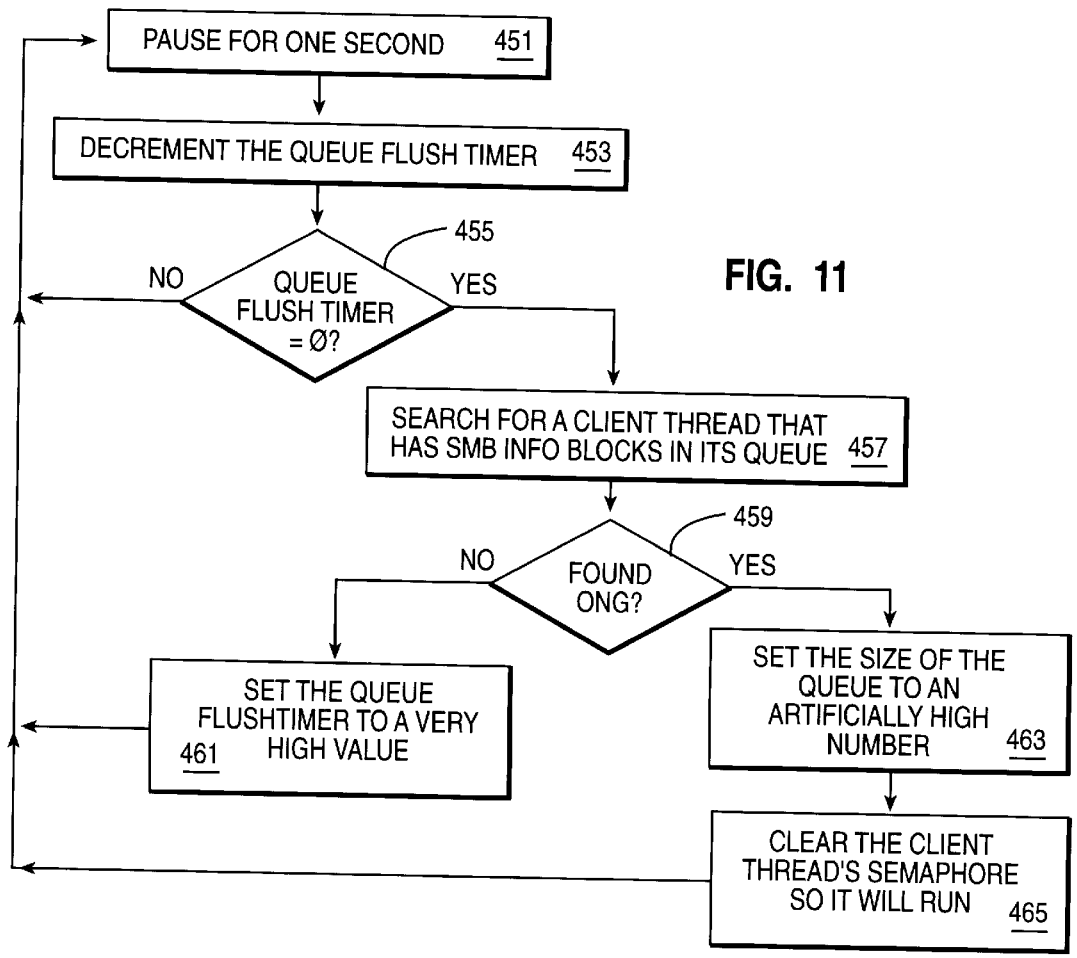

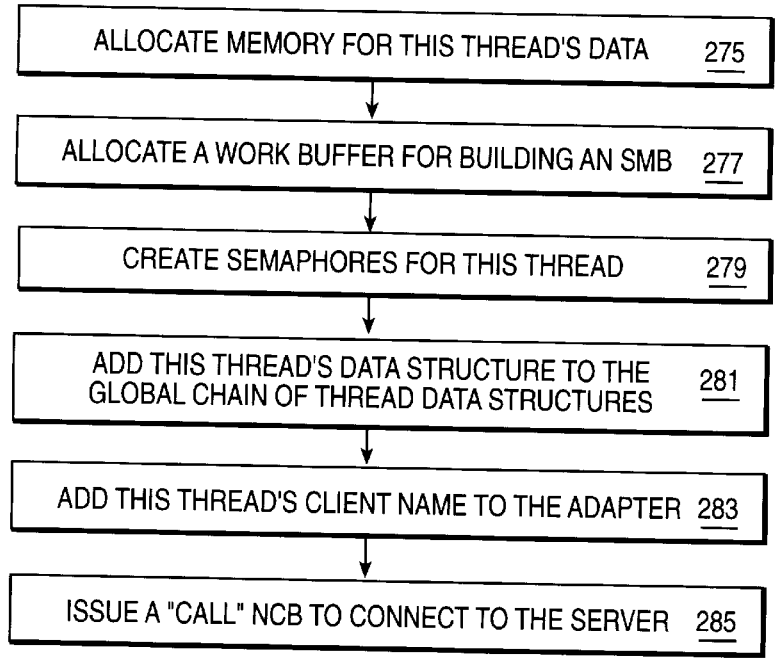
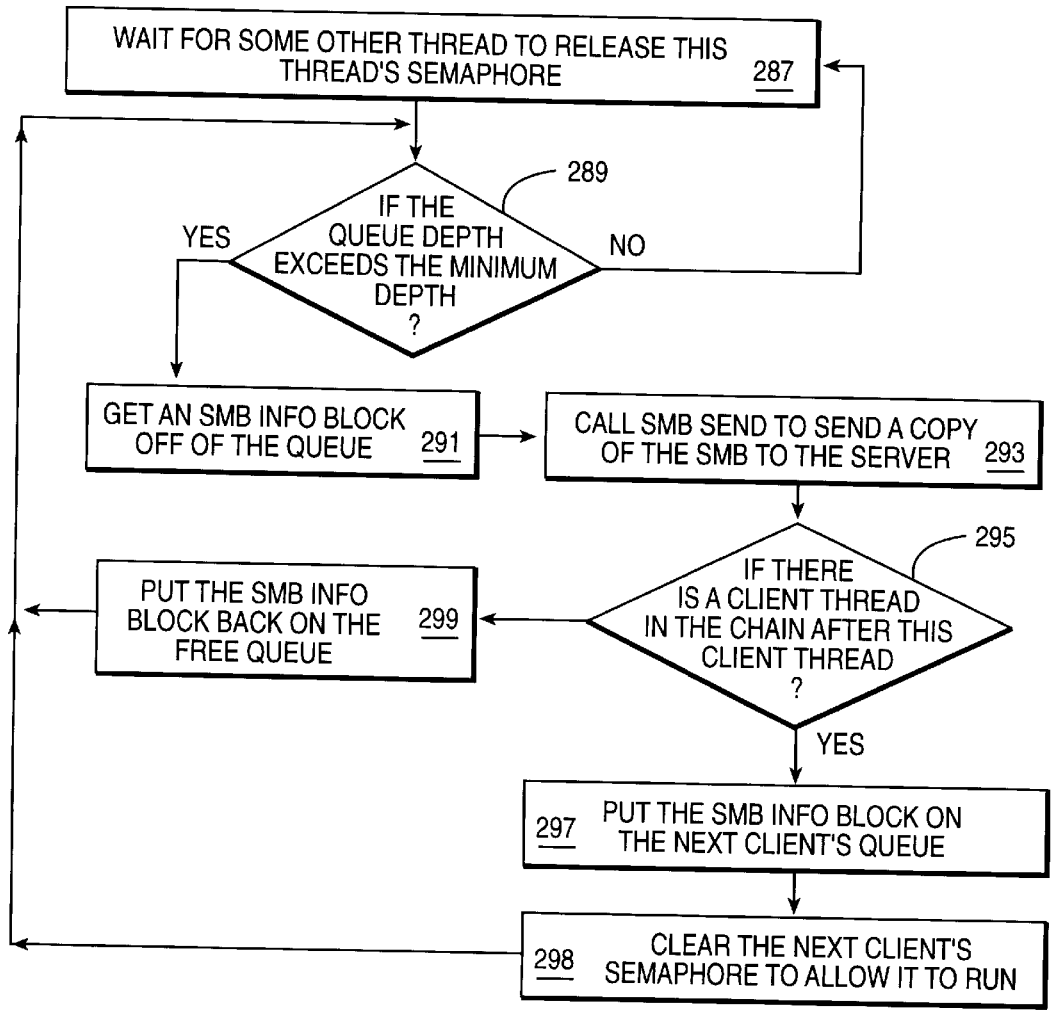
FIG. 6

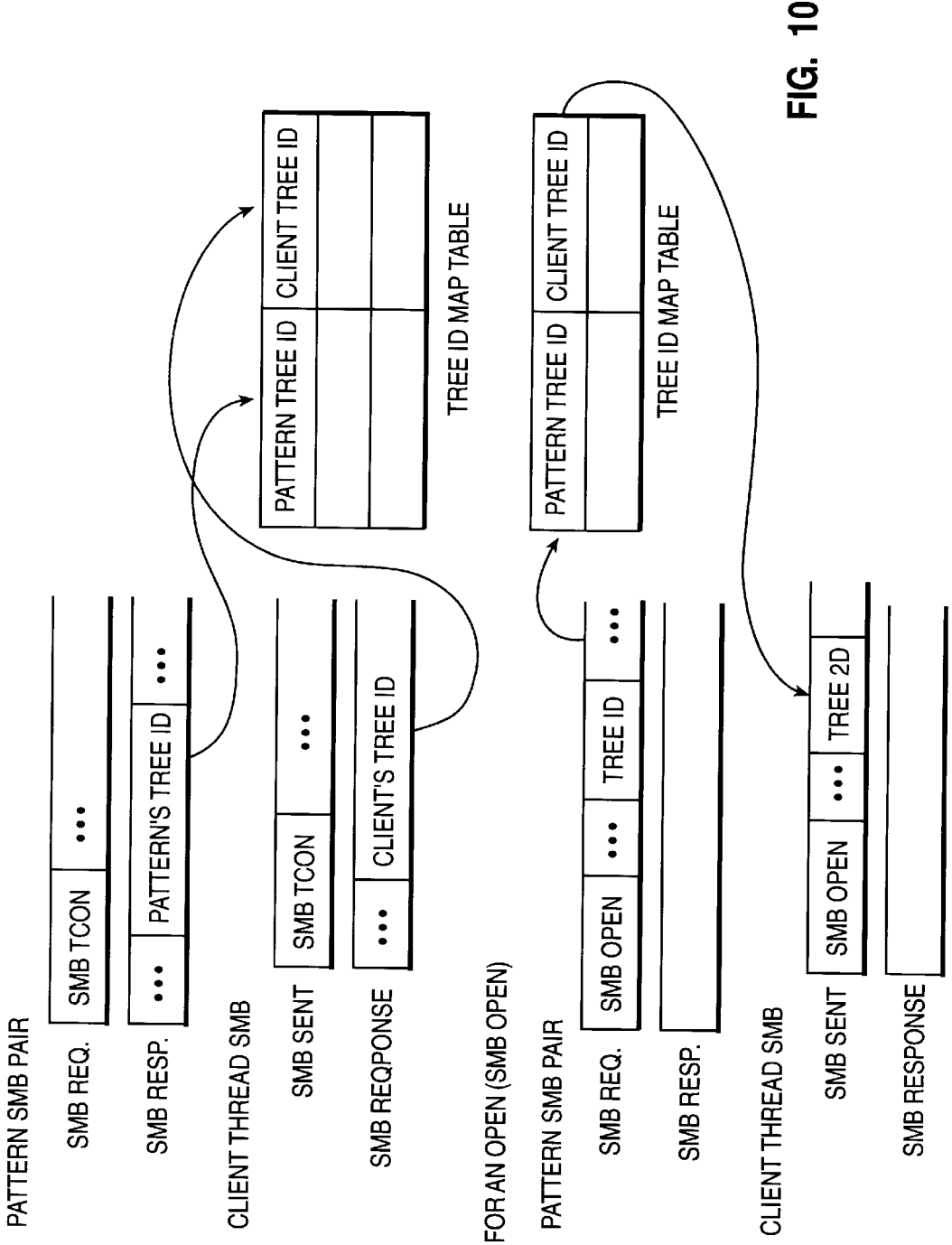

SIMULATION OF MULTIPLE LOCAL AREA NETWORK CLIENTS ON A SINGLE WORKSTATION

BACKGROUND OF THE INVENTION

The present invention relates generally to testing of a distributed computing environment. More particularly, it relates to the emulation of multiple local area network clients in a single workstation to test the capacity of a server program.

It has become commonplace to couple data processing systems together in a distributed computer network. One of the more popular paradigms in such a distributed computing network is to divide the functions provided by network software into client applications and server applications. Typically, the client applications are at a data processing system which is more or less dedicated to a single user and tends to be of relatively modest capability when compared the data processing systems elsewhere in the network where the server applications reside. The server applications provide services to multiple client applications such as file and print services as well as other services well known to the art. Newer versions of the server applications continue to become more capable than preceding versions as technology advances, particularly with regard to the number of clients serviced by a single server. At today's level of technology, a single server application may fulfill the requests of more than a thousand client applications.

Naturally, in the development of new client and server programs, the application developer must test the software to determine whether it can actually meet the design requirements, i.e. supporting the desired number of clients. In an ideal world, the developer would have unlimited funds and have a computer network comprising thousands of client machines coupled via one or more networks to the server to determine whether the newly developed application could support the stated number of clients. However, in the real world, funds are not unlimited and such a testing environment would be very expensive.

One known solution for emulating a high number of client workstations in a network is to write a software program which simulates the actions of a user in the network. The program would be copied to provide a plurality of such programs, each of these programs is placed in its own virtual machine in an operating system on a client workstation. Each process acts like a different user in the network, and thus, multiple client applications could be emulated by a single workstation. However, the solution has its limitations in that a typical workstation can only support five virtual machines due to memory and other system constraints. While emulating a thousand users with the prior art solution is an improvement, i.e. reducing a thousand client machine requirement to a two to three hundred client machine requirement, it is still quite expensive.

Thus, the need for improved simulation methods is apparent. One such method is provided by the invention described below.

SUMMARY OF THE INVENTION

Therefore, it is an object of the invention to emulate a large number of clients on a single computer system.

It is another object of the invention to minimize hardware and software requirements.

It is another object of the invention to test a server application in a wide variety of situations.

It is another object of the invention to emulate an interchangable plurality of client applications in a client/server environment.

These and other objects are accomplished by emulating multiple users in a network environment by means of a multithreaded process in a client workstation. In the process, a plurality of client threads and associated network request queues are provided. Each client thread emulates a user in the network environment. A series of network requests is provided to a first network request queue associated with a first client thread. In a preferred embodiment, a harvester thread receives network traffic from a network application such as a redirector in the client workstation. The harvester filters the network traffic to assemble network requests and corresponding network responses. Once assembled, the network requests and network responses are placed in the first network request queue. Each of the series of network requests to a server in the network environment by the first client thread. The first client thread sequentially sends each of the series of network requests to a next network request queue as each of the series of network requests are sent to the server. The process continues with each of the plurality of threads sequentially sending the network requests to the server and sequentially sending the network requests to the next network request queue so that a plurality of users are emulated.

BRIEF DESCRIPTION OF THE DRAWINGS

These objects, features and advantages will be more readily understood with reference to the attached figures and following description.

FIG. 4 is a flow diagram of the overall method according to the present invention.

FIG. 6 is a flow diagram of the client thread process of the present invention.

FIG. 10 is a diagram of some sample SMB fields.

FIG. 11 is a flow diagram of the timer thread process.

DETAILED DESCRIPTION OF THE PREFERRED EMBODIMENT

One preferred embodiment of the present invention is a program which creates multiple threads, each of which acts like a network client. Each client thread adds a network name to the list of network names in the network, and interacts with a server as though it were a separate user. The invention may be run on a variety of computers or collection of computers under a number of different operating systems running in a distributed network of other computers.

Although the specific choice of computer is limited only by processor speed and disk storage requirements, computers in the IBM PC series of computers could be used in the present invention. For additional information on IBM's PC series of computers, the reader is referred to *IBM PC 300/700 Series Hardware Maintenance* Publication No. S83G-7789-03 and *User's Handbook IBM PC Series* 300 *and* 700 Publication No. S83G9822-00. One operating system which an IBM personal computer may run is IBM's OS/2 Warp 3.0. For more information on the IBM OS/2 Warp 3.0 Operating System, the reader is referred to *OS/2 Warp V3 Technical Library* Publication No. GBOF-7116-00.

In the alternative, the computer system might be in the IBM RISC System/6000™ line of computers which run on the AIX™ operating system. The various models of the RISC System/6000 is described in many publications of the IBM Corporation for example, *RISC System/6000, 7073 and 7016 POWERstation and POWERserver Hardware Technical* reference, Order No. SA23-2644-00. The AIX operating system is described in *General Concepts and Procedure— AIX for RISC System/6000* Publication No. SC23-2202-02 as well as other publications of the IBM Corporation.

Figure 1:
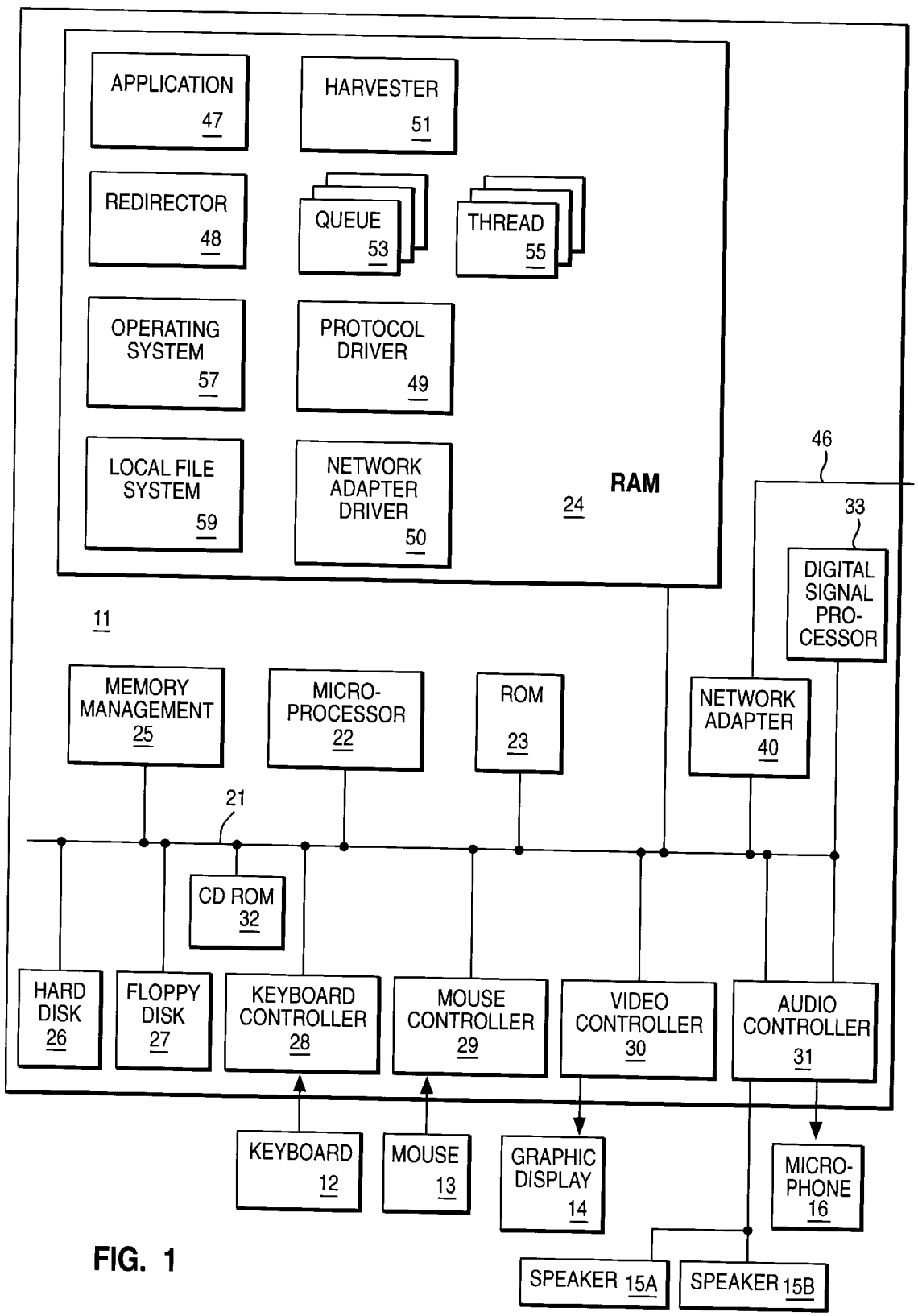
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PS/2 series of computers is one of the Intel family of microprocessors including the 386, 486 or Pentium™ microprocessors. However, other microprocessors including, but not limited to Motorola's family of microprocessors such as the 68000, 68020 or the 68030 microprocessors and various Reduced Instruction Set Computer (RISC) microprocessors such as the PowerPC™ chip manufactured by IBM, or other RISC chips made by Hewlett Packard, Sun, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The set of instructions can also be stored remotely and sent to the computer system over the network or Internet when desired. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. A network adapter 40 such as a Token Ring Adapter enables communication over a network 46 to other similarly configured data processing systems.

One of the preferred implementations of the invention is as sets of instructions 47–59 resident in the random access memory 24 of a computer system configured generally as described above. Until required by the computer system, the set of instructions may be stored in another computer memory, for example, in the hard disk drive 26, or in a removable memory such as an optical disk for eventual use in the CD-ROM 32 or in a floppy disk for eventual use in the floppy disk drive 27. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements. Further, the invention is often described in terms of determining or checking, or other terms that could be associated with a human operator. No action by a human operator is desirable in any of the operations described herein which form part of the present invention; the operations are machine operations processing electrical signals to generate other electrical signals.

Figure 2:
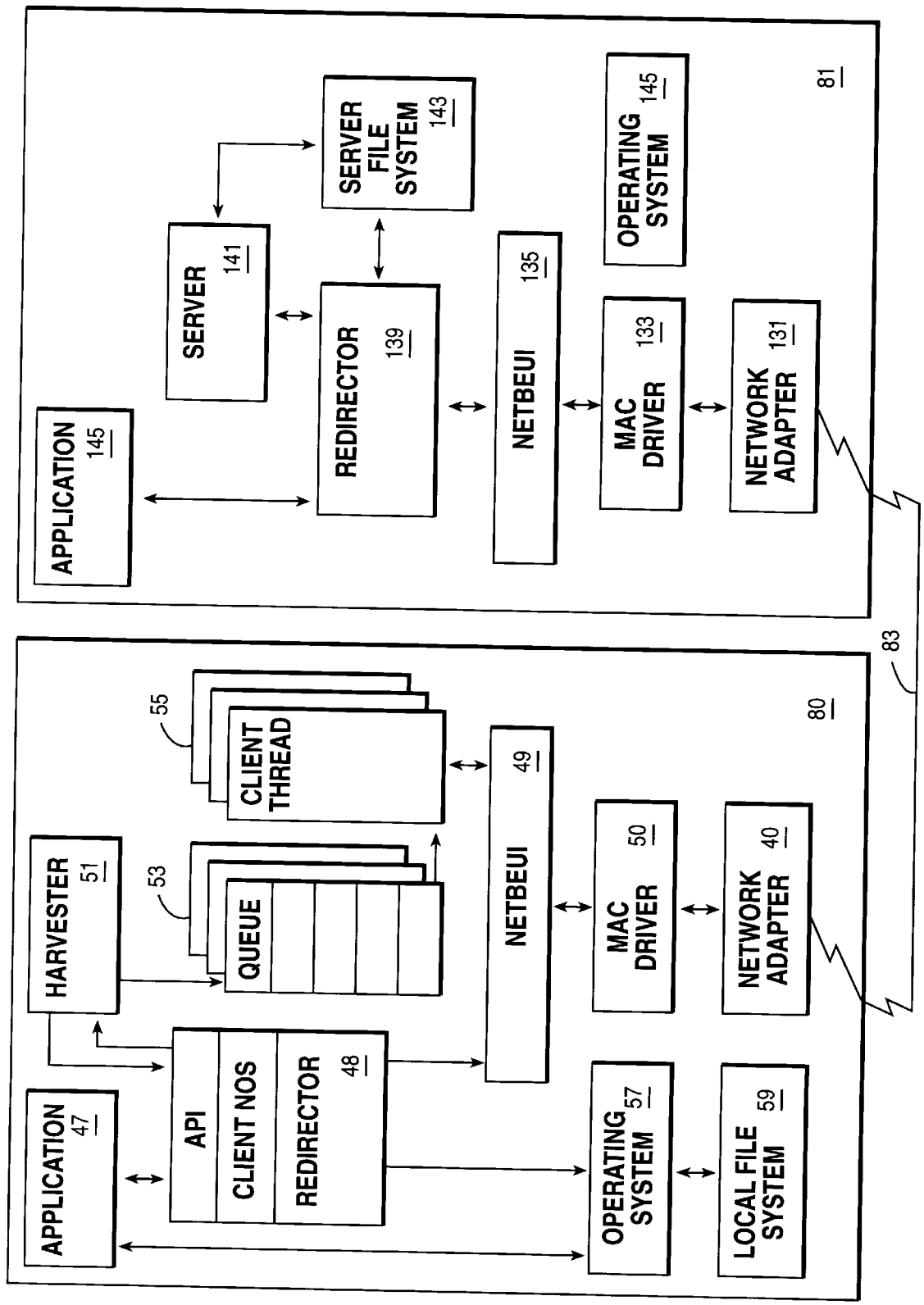
FIG. 2 is a architectural block diagram of a client and server machines configured according to the present invention.

In FIG. 2, a client machine 80 and a server machine 81 are shown coupled together by means of a local area network 83. A local area network (LAN) is a known means of connecting computer systems together in a high-speed limited distance computer network. A LAN comprises network adapters in each computer system and cabling to connect the network adapters together. A set of LANs may also be connected with special nodes called bridges or routers. By interconnecting LANS, thousands of computer systems may communicate with each other or with larger host-based computers. There are two common types of LANs in the market place, Ethernet and Token Ring. Ethernet uses coaxial cable and transmits at ten megabytes per second; Token Ring uses shielded twisted pair of cables and transmits at 16 megabytes per second. Fiber optic lines are also available and provide much faster data transmission at significantly higher costs. Infrared LANs are also known to the art.

Network software is typically implemented in a series of layers. The OSI model is one well-known description of the network layers. The lower layers provide services to the higher layers and protect the higher layers from device specific differences in LAN types and network adaptor types.

Applications 47 are generally considered to reside at the highest level of the network software and communicate to the client and server software by means of an application programming interface (API). A typical request starts in the client application 47 in the client computer 80, for example, a request to open a word processing document.

The client and server programs are higher layers which lie below the application layers, but on top of the transport layers, e.g., NetBIOS protocol layers. A LAN server program may provide a variety of services for client programs. A client requests services and the server provides them. Among the typical services provided are file and print services. One key component of the client network operating system (NOS) software is called the redirector 48. The redirector handles all requests from client applications 47 for shared resources and handles incoming and outgoing NetBIOS traffic to and from the transport layer 49, 50. The API calls made by the client application which pertain to these areas are passed to the redirector component by the operating system. There is a layer of APIs for the redirector and client NOS itself which the client applications may address, however, in general most client applications send the API calls to the operating system. For example, the redirector may use a NetBEUI interface to communicate to the NetBIOS protocol stack.

A redirector 48 serves as the interface between the client applications 47 and the network 83. To a client application 47, a remote drive on the server machine 81 appears to be the same as a local drive. The request made by the client application 47 may be directed by the network operating system to the redirector 48 if the need resource is on a remote shared drive, or it could be directed to a local file system 59, if the resource is on a local drive. If the request made by the client application 47 was for local services, the operating system 57 will send the request for processing by the local file system 59. It would be appreciated by one skilled in the art that the operating system 57 participates in many of the transactions between software blocks illustrated in the diagrams.

The redirector 48 generally translates the client request from the API syntax to a defined protocol optimized for client/server communication. One such protocol is called the Server Message Block (SMB) protocol. The SMB protocol has been submitted by Microsoft to X/Open as an open standard and has been accepted and published by X/Open as a common application environment in *CAE Specification, Protocols for X/Open PC Internetworking: SMB Version 2* and is a publication of The X/Open Company Ltd. ISBM 1 872630 4 5 6. A revision of the SMB specification for the Windows NT operating system is currently proposed. A discussion of the blocks in a typical SMB message is described below in connection with FIG. 10. The Netware Core Protocol (NCP) is a similar level protocol in the Netware Operating System sold by the Novell Corporation.

Requests from the client application 47 are converted by the redirector 48 to SMB packets and sent via the transport layers 49, 50 to the server. Responses from the server are converted back by the redirector to the API in which client application 47 made by original request. A single API call may result in the redirector 48 sending several different SMB packets. Of course, calls to access local data stored by the operating system 112 to the local file system 59 do not generate any SMB packets.

The SMB is used for communication between the redirector and file servers and print servers. A client request sent by an API for file services, for example, will result in a particular SMB packet being sent to the file server. The following are some examples of protocol requests which may be made using the SMB protocol. OPEN FILE, CREATE FILE, CLOSE FILE, FLUSH FILE, READ, WRITE, CREATE DIRECTORY, DELETE DIRECTORY, MAKE NEW FILE, DELETE FILE, RENAME FILE, GET FILE ATTRIBUTES, SET FILE ATTRIBUTES, LOCK RECORD, PROCESS EXIT, CHECK PATH, GET SERVER ATTRIBUTES, NEGOTIATE PROTOCOL, FILE SEARCH, SESSION SETUP, TREE CONNECT, LOGON, FIND FIRST, AND FIND NEXT.

If the request for a service made by a client application is for the services of or disk drives serviced by the server application, in one preferred embodiment, the redirector will create a Network Control Block (NCB), which includes the SMB protocol message. This NCB is sent to the protocol driver layer 49 and MAC driver 50 to be sent over the network adapter 40. The transport layer 49 is relatively simple in the illustrative embodiment of FIG. 2, being composed of the NetBEUI protocol driver 49. Many multilayered network protocols are known at this level. The network protocol driver 49 provides a communications pipeline for layers above it from the network. There are many types of protocol drivers in use for LAN systems; the Network Basic Input-Output Support (NetBIOS) is one of the earliest protocols. NetBIOS provides functions such as name registration, virtual circuit and datagram communication. NetBIOS can use one of several internal protocols to communicate across the network, e.g., NETBEUI, XNS or TCP/IP. Whichever internal protocol is used, a Network Control Block (NCB) is generally used to encapsulate the data. However, a sockets interface is also known for data encapsulation of NetBIOS. NCBs are submitted to NetBIOS using a NetBIOS API. NCBs and NetBIOS are described in U.S. Pat. No. 4,718,005 "Distributed Control of Alias Name in Networks" and U.S. Pat. No. 4,644,470 "Nonunique Names for Broadest Messages" to Feigenbaum et al. and U.S. Pat. No. 4,644,468 "Name Usage Support Through Distributed Processing Networks Linked by Bridges and/or Gateways" to Doster et al. One skilled in the art would appreciate that other network protocols are known and can be used with the invention. For example, the NCP uses Novell's Internetwork Packet Exchange (IPX) as the underlying network protocol.

A medium access control device driver (MAC) 50 residing at one of lowest layers of the network software is used to couple the network adaptor to the rest of the networking software. As mentioned above, Ethernet and Token ring adapters 40 are known to the art and will would have corresponding drivers. In the MAC driver layer 50, the NCB may have additional protocol blocks wrapped around it, according to the protocol of the network adapter. Encapsulation is well known to the art and not be discussed further.

The message, i.e. the client request translated into SMB format and encapsulated by the NCB and MAC protocols, is sent over the network 83 to the server machine 81 where it is received by LAN adapter 131. The MAC driver 133 sends the message up to the protocol stack 135 which may be NetBEUI to the redirector 139 of the server. The request is then directed to the server 141, the server file system 143 or other components as desired. In one preferred embodiment of the invention, there is a redirector component 139 at the server machine.

In one preferred embodiment of the applicant's invention, a harvester mechanism 51 is used to obtain copies of SMB traffic from the redirector to simulate multiple clients at the single workstation. The harvester may work in at least one of two ways. In the first embodiment, the harvester 51 takes advantage of a trace facility provided in the redirector of networking software. The harvester calls for trace data from the redirector on the SMB requests and SMB responses made by or in response to the requests of the client application 47. The harvester packages the SMB requests and response into an SMB information block. The SMB information block is passed on to client threads which replicate the SMB requests making the single workstation look like many workstations on the network.

Alternatively, if the trace utility is unavailable, the harvester can listen to the traffic between the redirector 103 and the NetBEUI stack 107 and capture the request/response pair. Also, it is possible is to build the translation function of the redirector into the harvester itself, however, this is less preferred because of the knowledge and effort required. Further, by separating the harvester, redirector and client application functions, the harvester is more portable into different network environments as well as a variety of client applications can be interchangeably tested.

The SMB information block is put into a queue 53 for the client thread 55. The client thread puts the SMB into a network control block (NCB) and sends the NCB to the transports 49. Each thread processes its respective queue of SMBs, sending both the network control block to the transport layer 49 as well as sending the SMB information block to the top of the next client thread by placing the processing by its respective client thread.

Figure 3:
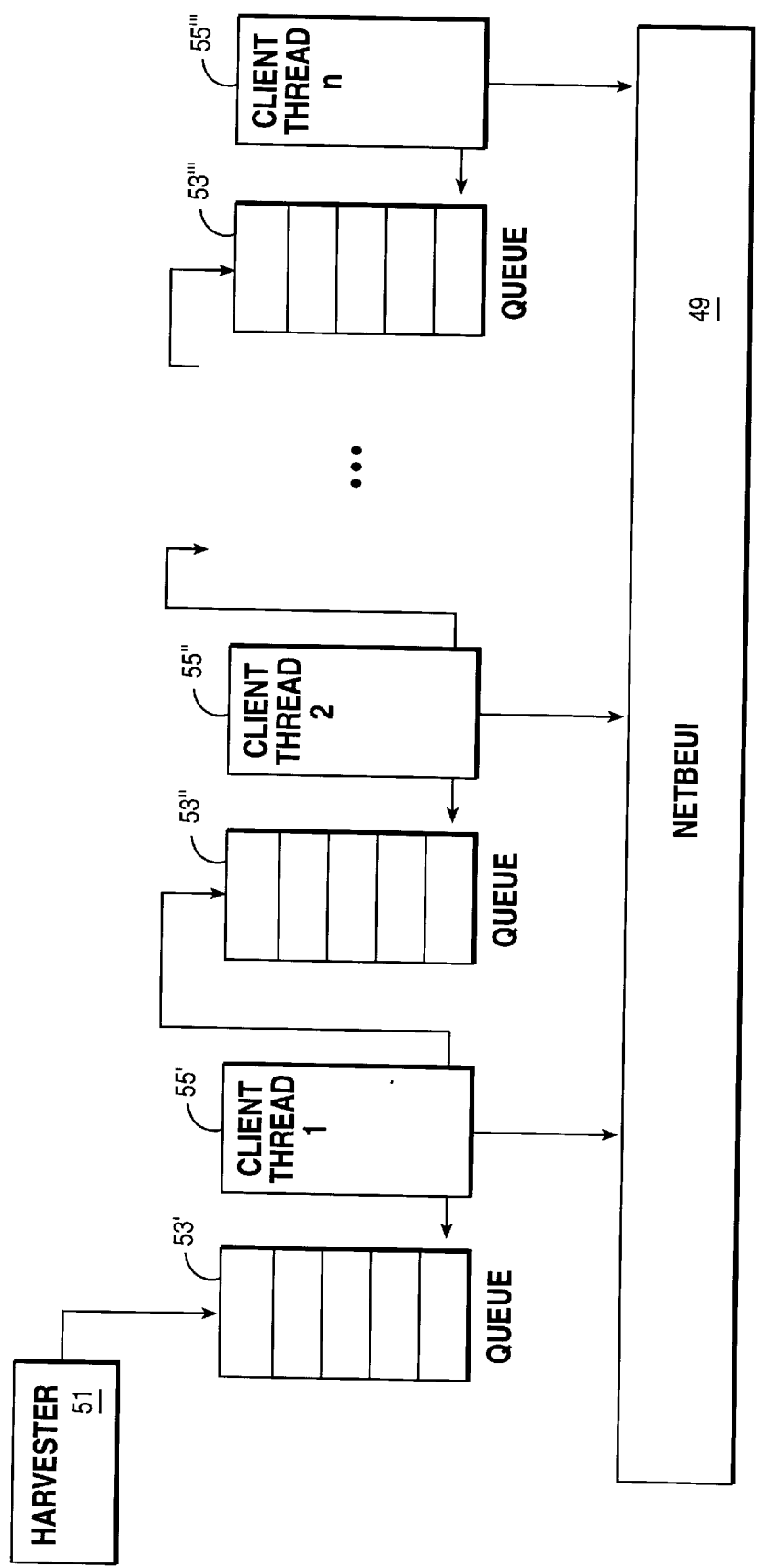
FIG. 3 is a detailed architectural block diagram of the harvester client threads and client queues according to the present invention.

This process is illustrated in greater detail in FIG. 3. In FIG. 3, the harvester 51 is shown sending the SMB information block to the first SMB queue 53'. This SMB request/response pair is used by the client thread 55' to generate the first request to the server through the transports 49. As discussed below, appropriate timing considerations must be made when selecting the size of the SMB queues to avoid conflicts between the threads. Otherwise, the entire multi-client emulation process stops. These considerations will be discussed in greater detail below.

The SMB information block is also sent to the second queue 53" for the second client thread 55". The same request is then made to the server by the second client thread 55" with appropriate delay so that there is no conflict between threads for the same server resource. The process continues where each successive client thread sends the SMB request to the server via the transports as well as forwarding the SMB request to the next SMB queue until the last SMB queue 53'" receives the SMB and the last client thread 55'" sends the NCB request to the transports.

The program creates multiple threads each of which acts like a separate LAN client. Each client thread adds a NetBIOS name to the adapter. Each name acts as another user on the network. Each thread then issues a NetBIOS call to establish a NetBIOS session with a server.

By using the trace facility, the harvester 51 can gather pairs of SMB requests and the corresponding SMB responses that are returned from the server. These pairs are packaged into SMB information blocks which are passed on to the client threads. Each of the client threads uses the SMB information block to create its own SMB request that it sends to the server over its own NetBIOS session. Note that the client threads mimic the SMB traffic which is generated by the client application in the workstation. This allows a tester, who is interacting with a client application, to perform a variety of network tests from the client workstation. The invention takes the SMB traffic generated by these actions and multiplies it over numerous NetBIOS sessions. Thereby, the server will see multiple requests coming in over multiple sessions each on a different NetBIOS name. To the server application, it looks as though many different users are making similar requests over the network. The SMB response is needed to map information in the source SMB request to the client thread information e.g., file IP.

Each client thread must keep track of certain information which is unique to the NetBIOS session with server, i.e. the user which it is emulating. For example, when the client application opens a file on the server, server returns a file ID. The client application would use this file ID to read the file and the file handle is also unique to the client application. In the invention, the open and read SMBs are retrieved by the harvester and passed on to the client threads. When the client issues the open SMB, the client thread will receive a different file ID back from the server. In other words, each client thread will receive a different file ID. For the client threads to mimic the client application, their unique file ID returned must be used in the read SMB which they pass to the server. If the client thread failed to use the appropriate file ID, the server would return an error to the client thread which would stop the emulation process. Since the purpose of the invention is to test the capacity of the server, the processing must be managed to provide continuous requests. There are other data which would be unique to each client thread such as search ID, connection IDs and session keys. The client threads must manage this data and map the fields in the SMB from the client application to their own values as they generate network traffic. When a client thread encounters one of these fields, it substitutes its own value into the SMB before sending the SMB request to the server.

One condition to be avoided is having two client threads access the same file on the server at the same time. In some operating systems such as OS/2, a program can open a file and deny access to other programs while the program has the file open. If a client thread tries to open a file while another client thread has the file open, the second client thread's request to open the file will be "failed" by the server. Thereafter, the client thread will not be able to mimic any of the other operations on the file as the client thread's open request failed. To circumvent this problem, each of the client threads has a queue of SMBs which it is to emulate. The depth of the queues is configurable by the tester. A client thread will not process an SMB until its queue reaches a threshold specified by the tester. The threshold is adjusted so that client threads will not attempt to open the same file.

For example, given a queue depth of five, the client application may issue the following SMBS: Open, Read, Close, Find First, Find Next and MkDIR. The Open, Read, Close, Find First and Find Next SMB requests will be placed on each client thread's queue before the client thread actually processes them. When the MkDIR SMB request is placed on the queue, the client thread's queue depth exceeds five so that the client thread begins processing the first SMB request in its queue. In this example, the "open" SMB request is the first request. By the time the first client thread is processing the "open" SMB request, the client application has closed the file. Thus, the server will not reject the client thread's request to open the file. In this way, each client thread will be able to successfully emulate the other SMBs which were issued by the client application. When the first client thread has finished processing the "open" SMB request, it puts the open SMB on the queue of the second client thread. The second client thread will not begin processing the SMB requests until its queue depth exceeds five. The first client thread will be finished with the file when the second client thread begins processing its queue and issues its own "open" SMB.

The queue depth can be user configured so there is sufficient delay between the client threads' use of the same SMBS. Thus, each client thread's SMBs can be processed successfully by the server. Depending upon the testing sequence desired by the tester, the queue depth may be adjusted appropriately.

In one alternative embodiment, intelligence can be added to the harvester so that the harvester can dynamically adjust the depth of the queues. The queue depth starts out as a default value, e.g., five SMB requests. The harvester monitors the requests against a table of possibly conflicting requests and adjusts the queue depth in the case that the default value is inadequate. For example, the harvester will sense that an open SMB has been issued by the client application. If four additional SMBs have been issued and none of them have been a close SMB, the first client thread's request would fail unless the queue depth is increased. The harvester will continue to increase the queue depth of the client threads until a close SMB has been issued.

Another possibility is for the harvester to put sentinels in the queue that mark the division between sets of commands that should be processed together. For example, the harvester could put SMB information blocks for "open", "read", "write", and "close" into the queue. It then puts a sentinel value, say −1, into the queue. The client thread would wait until it saw the sentinel value before it begins to process the queue.

In one preferred embodiment, the number of client threads is a command line option. That is, the number of client threads is determined by the user before the harvester starts running. Alternatively, the program can create threads dynamically based on how much memory is in the system.

In addition to the preferred interactive embodiment above, the user can send a script of SMBs to the harvester to load into the first client thread. This has the possible advantage that the tester could conduct a lengthy test and not need to be physically present once the test has begun. However, when the responses of the system are basically unknown, it is helpful to have the tester physically present to take corrective action or note down the problems encountered. The script can also be run as the application program, e.g., a .CMD file with a series of simple commands—type file1, copy file1 file2, del file3, etc. . . . A script for the harvester is actually more involved than a script for the application level.

FIG. 4 is a flow diagram of the overall process flow. In step 201, the SMB request/response is captured by the harvester, either from the trace facility or by listening to the redirector. In step 203, the SMB information block is loaded into the first client thread queue. In step 205, the first client thread tests for whether the queue depth is exceeded. In step 207, once the queue depth is exceeded, the client thread processes the SMB information block and sends its own version of the SMB to the server. It then passes the SMB information block on to the next client thread by putting it in its queue in step 209. The process recycles back to step 201 where the next SMB is captured by the harvester. One skilled in the art will appreciate that once the various client threads are generated and their respective queues reach the queue depth many of the steps will be occurring concurrently in the respective threads.

Figure 5:
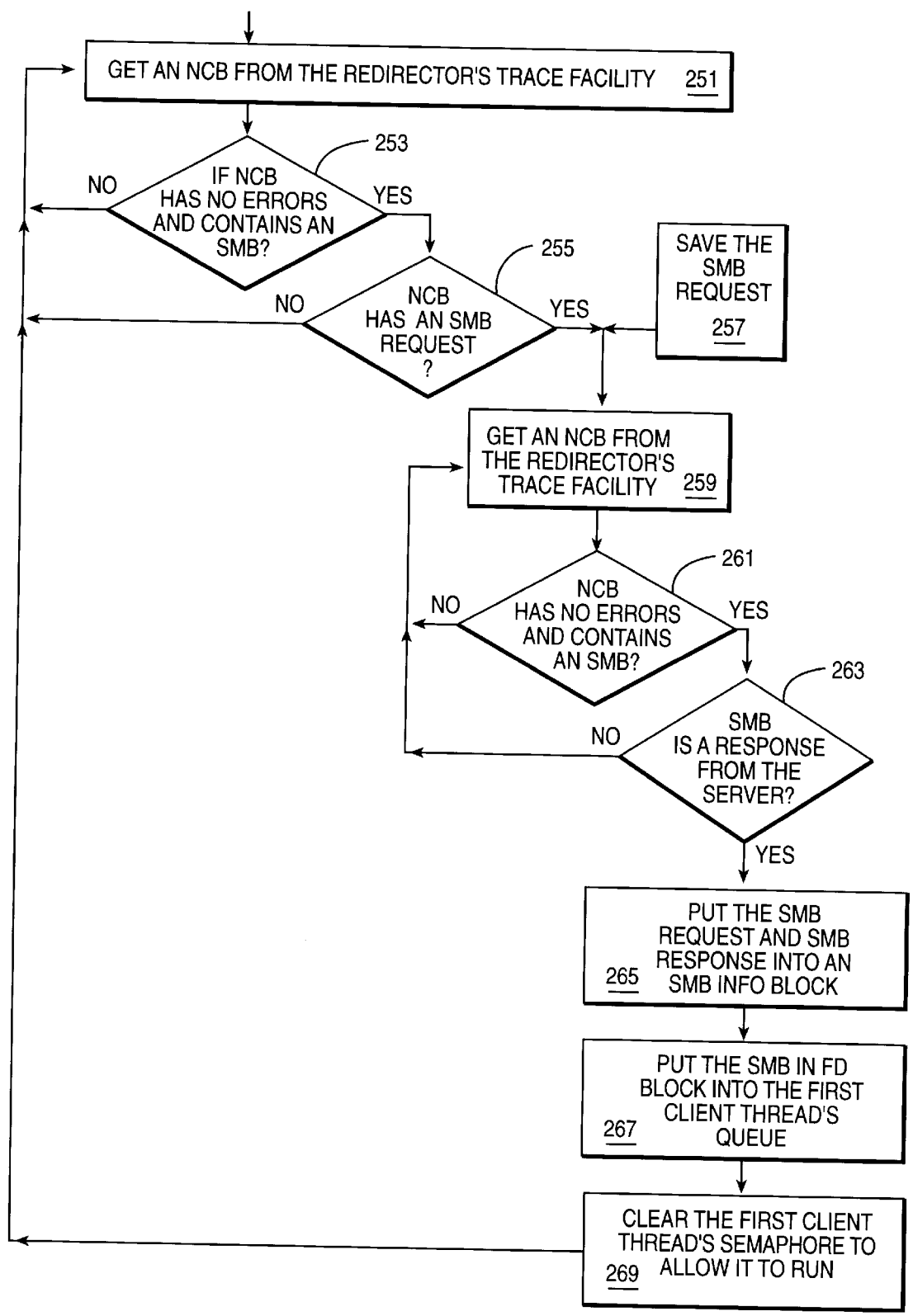
FIG. 5 is a flow diagram of the harvester process of the present invention.

The harvester process is depicted in FIG. 5. In the process, the NCBs are filtered so that only appropriate requests are used. That is, NCBs that do not contain SMBs or that have NCB errors are ignored. Further, the request and response are packaged together and put onto the queue of the first client thread. In one preferred embodiment, the harvester runs an eternal loop that calls the Redirector's trace facility. In step 251, the redirector's trace facility will pass all NCBs up to the harvester. In step 253, a step is performed to determine whether the NCB has an error and contains an SMB. If so, in step 255, a test determines whether the SMB was an SMB request. This is accomplished by checking the SMB_RETURN flag in the smb_flg field of the SMB. If the SMB was a request, the harvester allocates an SMB information block from the pool of SMB information blocks and copies the SMB request into the SMB information block. If so, in step 257, the SMB is saved in a temporary queue.

Next, the harvester continues to sift through the NCBs until it sees the response SMB coming back from the server which corresponds to the SMB request going out from the client application. In step 259, the harvester receives another SMB from the redirector's trace facility. The tests in step 261 and 263 examine the NCB for errors and whether it is an SMB response from the server. In step 265, the SMB request and response are packaged together in an SMB information block. In step 267, the SMB information block is placed onto the queue of the first client thread. Then, in step 269, the first client thread's Run Semaphore is cleared to notify the thread that it has an SMB information block in its queue.

The client thread process is shown in FIG. 6. The process begins in step 275 by allocating memory for the particular client thread's data structure. Next, in step 277, the system allocates a work buffer for building the SMBS. In step 279, the semaphores for this thread are created. The client thread has two semaphores, the run semaphore and the queue semaphore. The run semaphore tells the client thread when to run. The client thread will go to sleep until its run semaphore is cleared. Other threads, such as the harvester or other client threads, will clear the semaphore when the client thread has new work to do. The queue semaphore is used to protect access to the client thread's queue. The queue semaphore guarantees that only one thread has access to the client thread's queue at one time. Next, in step 281, the client thread's data structure is added to a global chain of thread data structures. The global chain of data structures is the actual implementation of the chaining of the client threads. The client threads determine which thread is next in the chain by looking at which thread's data structure appears after its own in the chain. This global chain also allows the client threads to access each other's queues and semaphores. In step 283, the thread's client name is registered on the network. In step 285, a Call NCB is issued to connect the client thread to the server.

The process continues by running an continuous loop to process the client thread's SMB queue. In step 287, the system waits for some other thread to release this thread's semaphore. A loop is run to process the thread's SMB queue as long as the number of elements on the SMB queue exceeds the minimum queue depth, step 289. In step 291, an SMB information block element is retrieved from the SMB queue. In step 293, the Send SMB procedure is called to send the SMB to the server. Next, a test in step 295 is performed to determine if there is a client thread after this one in the chain. If so, in step 297, the SMB information block is enqueued to the next client thread queue. In step 298, the next client thread's semaphore is cleared to allow it to run. If there is no client thread in the chain after the current client thread, the SMB information block is put back into the pool of SMB information blocks.

Figure 7:
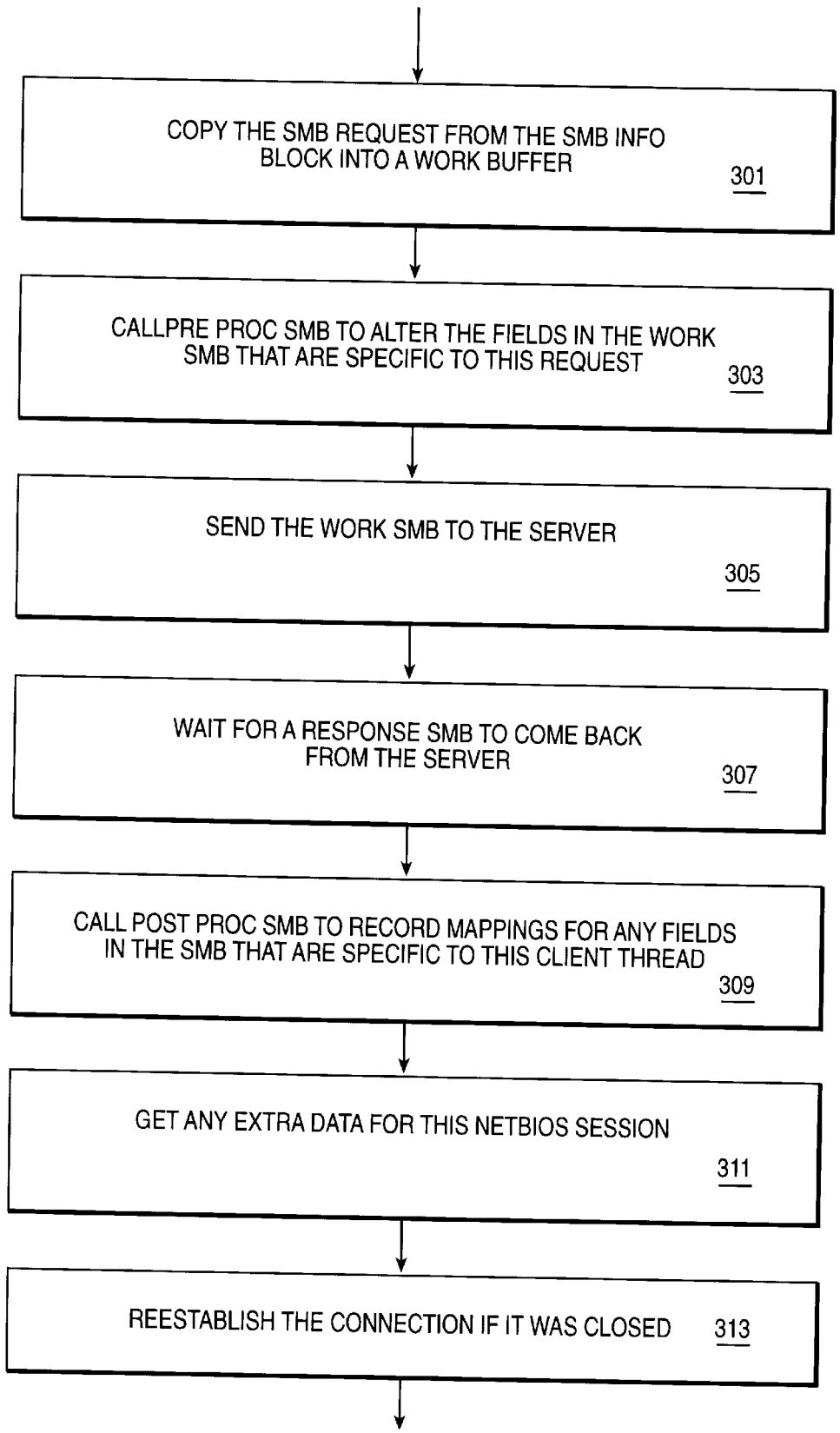
FIG. 7 is a flow diagram of the send SMB process of the present invention.

The Send SMB process is illustrated in FIG. 7. SendSMB is given an SMB information block. The SMB request in the SMB information block is used as a pattern for the SMB that is to be sent by the client thread. The process begins in step 301 where the SMB request is copied from the SMB info block into a work buffer. In step 303, the PreProcSMB process is called to alter the fields in the SMB that are specific to this client thread. This process is described in greater detail below. Next, in step 305, the SMB is sent to the server. The process waits for a response back from the server, step 307. Once a response is received from the server, the process calls the PostProcsMB process to record any fields in the SMB that are specific to this client thread, step 309. This process is described in greater detail below.

Figure 8:
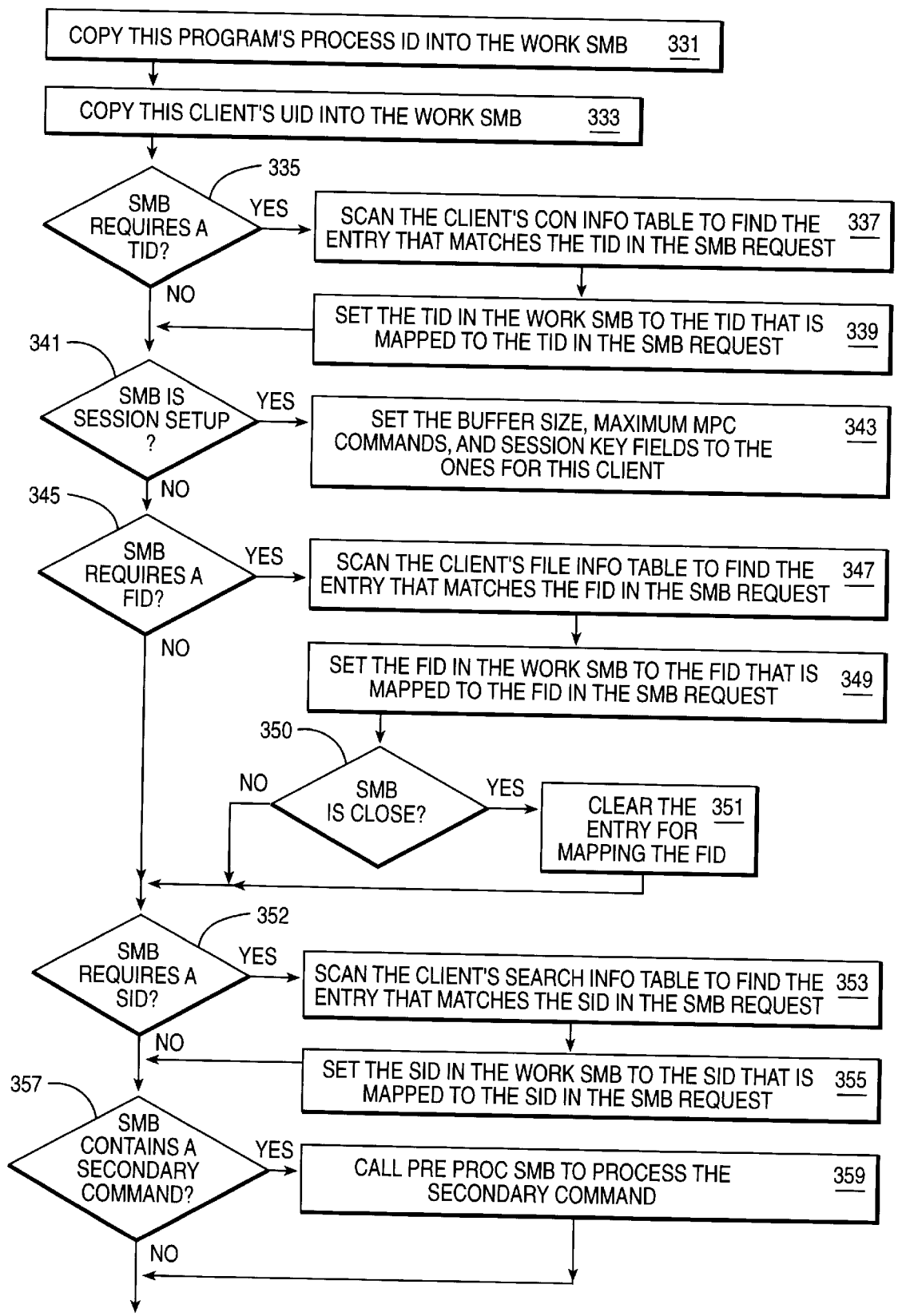
FIG. 8 is a flow diagram of the preprocessing for the SMBs.

The PreProcSMB process is shown in FIG. 8. The process begins in step 331 when the client thread's process ID is copied into the SMB to be sent. then, in step 333, the client thread's session UID is copied into the SMB. In step 337, a test is performed to determine if the SMB command is one that requires a connection ID. If so, the client thread's connection ID mapping table is scanned in to find the entry that matches the connection ID in the source SMB, step 337. Then, in step 339, the connection ID is set in the SMB to be sent to the client thread connection ID that is mapped to the connection ID in the source SMB.

Next, in step 341, a test is performed to establish if the SMB command is for a session setup. If so, in step 343, the process sets the buffer size, maximum MPX commands, and session key fields in the SMB to be sent. The test in step 345 determines if the SMB command takes a file ID. If so, in step 347, the file ID mapping table is scanned to find the entry that matches the file ID in the source SMB. In step 349, the file ID in the SMB to be sent is set to the file ID that is mapped to the File ID in the source SMB.

Next, the test in step 350 determines if the SMB command is for closing a file. If so, in step 351 the file ID mapping entry in the file ID mapping table is deleted since the file is no longer open.

In step 352, the test establishes if the SMB command takes a search ID. If so, the process scans the search ID mapping to find the entry that matches the search ID in the source SMB, step 353. In step 355, the process sets the search ID in the SMB to be sent to the client thread search ID that is mapped to the search ID in the source SMB.

The test in step 357 determines if the SMB command contains a secondary command. If so, in step 359, the process calls the PreProcSMB process recursively to process the secondary command.

Figure 9:
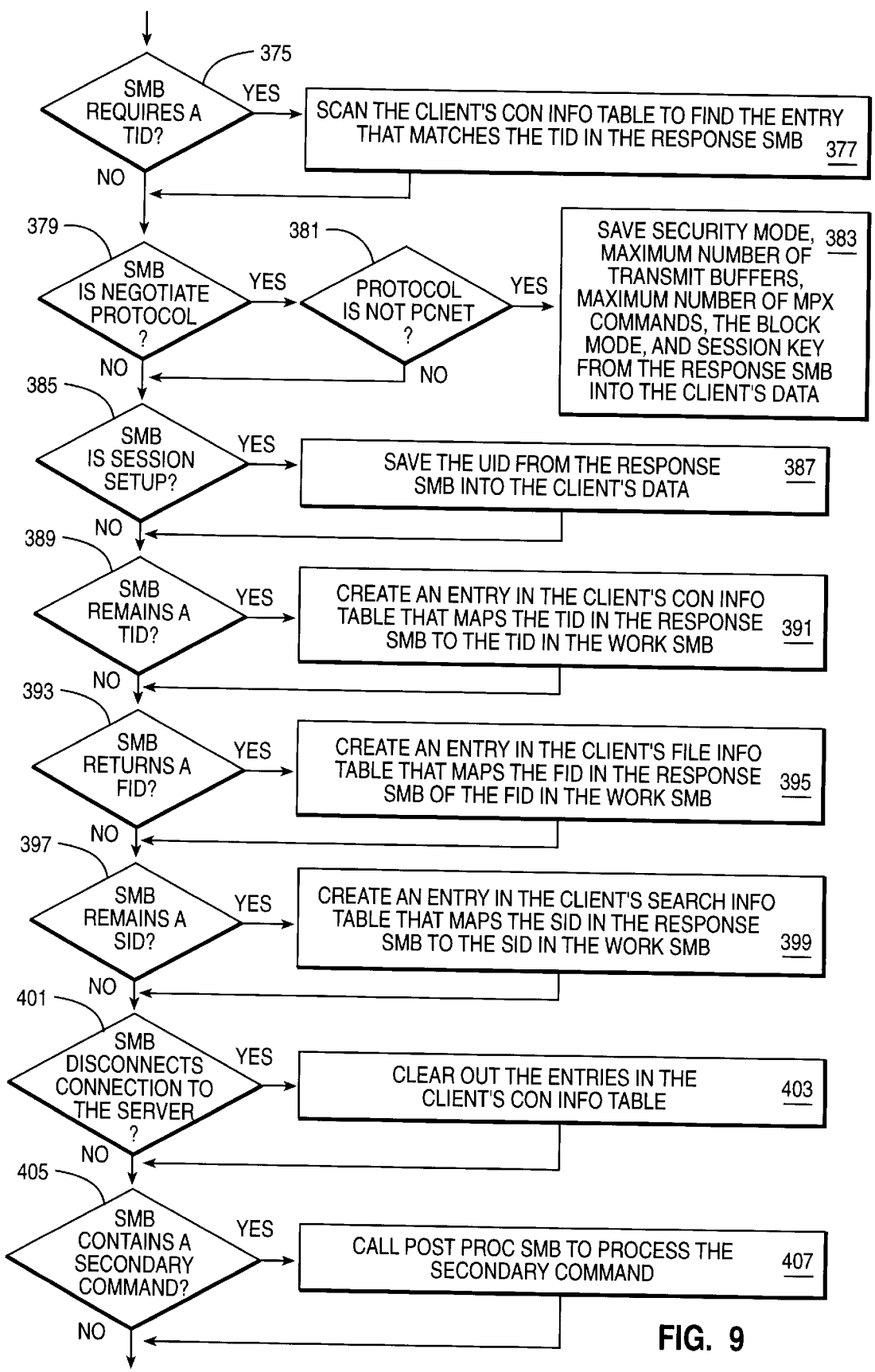
FIG. 9 is a flow diagram of the postprocessing for the SMBs.

The PostProcSMB process is shown in FIG. 9. In the test in step 375, the process determines if the SMB command is one that requires a connection ID. If so, the connection ID mapping table is scanned to find the entry that matches the connection ID in the source SMB. In step 379, a test ascertains whether the SMB command is the Negotiate Protocol SMB. If so, step 381 tests for the protocol. If it is not PCNET1, step 383 saves the security mode, maximum number of transmit buffers, maximum number of MPX commands, and the block mode from the source SMB. Also, in this step the session key from the source SMB is saved in the SessInfo structure for this client thread.

In step 385, a test establishes whether the SMB command is Session Setup. If so, the UID from the source SMB is saved in the sessinfo structure for the client thread's path, step 387. If the SMB command was one that returns a connection ID, step 389, an entry in this client thread's connection ID mapping table that maps the connection ID of the source SMB to the connection ID in the SMB that was returned from the server, step 391.

If the SMB command was one that returns a file ID, step 393, the process creates an entry in this client thread's file ID mapping table that maps the file ID of the source SMB to the file ID in the SMB that was returned from the server, step 395. The test in step 397 ascertains whether the SMB command was one that returns a SID. If so, step 399 creates an entry in this client thread's search ID mapping table that maps the search ID of the source SMB to the search ID in the SMB that was returned from the server.

Next, in step 401, the test determines if the SMB command was one that disconnects the connection to the server. If so, in step 403, the process clears out the entries in the client's ConFinfo table. The test in step 405 establishes whether the SMB command contains a secondary command. If so, the PostProcSMB process is called recursively to process the secondary command, step 407.

The process detailed above depends on data structures which are associated with each client thread. The client thread uses the SMB request in the SMB information block, which was the SMB that was sent for the application program, as a pattern for the SMB that it will send to the server. Since a client thread can not use the connection IDs, file IDS, and search IDs in the SMB that was sent for the client application, the client thread will substitute its own connection IDs, file IDs, and search IDs into its own SMB before it sends it to the server. Each client thread must keep a mapping of the connection IDs, file IDs, and search IDs of the client application's SMBs to the connection IDs, file IDs, and search IDs that are used by the client thread's session with the server.

For example, FIG. 10 shows the mapping of a connection ID in the SMB request in an SMB information block to the connection ID used by a client thread in the SMB it sends to the server. The client thread is given an SMB information block that has and SMB request for a Tree Connect command. The client thread sends its version of the Tree Connect SMB to the server and gets a response back. The Connection ID that the client thread received in the SMB will be different from the connection ID in the SMB request in the SMB information block. The client thread will save the mapping from the connection ID in the SMB request in the SMB information block to the connection ID that it received from the server. The mapping is stored in the connection ID mapping table. The next SMB information block contains an Open SMB. The open SMB requires a connection ID as part of the SMB request. The client thread uses the SMB request in the SMB information block as a pattern for the SMB that it will send to the server. The client thread can not use the connection ID given in the SMB request in the SMB information block. That connection ID belongs to the client application, not the client thread. If the client thread uses the client application's connection ID, the server will fail the SMB request sent by the client thread. The client therefore uses its connection ID mapping table to map the connection ID from the SMB request in the SMB information block to the connection ID for the client thread. This allows the client thread to use its own connection ID in the SMb it sends to the server.

Of course, those skilled in the art would recognize that other mapping tables would be required and that other data structures would be used to construct those tables depending on the particular protocol used by the server and client for network communication.

The TimerThread process is illustrated in FIG. 11. The TimerThread function handles all the timer related processes. TimerThread is preferably initiated as a separate thread. The process basically runs a continuous loop where it sleeps for a second, step 451, and then checks if there is anything to do. Under normal operation, the client threads pass the SMB information blocks onto each other. The queue passing is driven by the SMBs that come out of the harvester. As long as the harvester is sending SMB info blocks to the queue of the first client thread, the client threads keep running and processing their respective queues.

However, eventually there is a period when there is no SMB activity. The harvester quits harvesting SMBs which means that new SMB information blocks are not sent into the client threads' SMB queues. The queues remain filled to their specified depth and the client threads are not woken up to process them. A mechanism is required to flush the work left undone by the client threads. The queue flush timer was created to clear up the queues. The harvester resets the QueueFlushTimer each time an SMB info block is enqueued on the first client queue, step 453. When the harvester ceases to harvest, the timer dwindles to zero, step 455. When it hits zero, this timer thread will search for a client thread with requests in its SMB queue, step 457. If none are found, step 459, the queue flush timer is set to a very high value, step 461. However, once a client thread with requests in its queue is confirmed by the test in step 459, the timer thread artificially forces the size of the size of the client queue to a very large number, step 463. This will "fake" the client thread into processing all of the SMB requests on its queue, step 465. These SMB requests will cascade down to the client threads that are further in the chain, causing those client threads to wake up as well. Each time the timer thread wakes up, it will try to force a client thread to process its SMB request queue as long as the QueueFlushTimer is zero and there is a client thread with a non-empty queue.

The invention can easily emulate 50–200 users from a single client workstation depending on the complexity of the requests made, the size of the files accessed, the size of the client workstation and other factors. One skilled in the art would recognize that the invention could be implemented at a plurality of workstations to emulate whatever the desired number of users. One interesting alternative embodiment is that two sets of client threads can be serviced by a single harvester. The tester can use two client applications on the workstation concurrently. The session ID of each client application is used to route the network request and network response to the appropriate set of client threads.

While the invention has been shown and described with reference to particular embodiments thereof, it will be understood by those skilled in the art that the invention can be practiced, with modification, in other environments. In the illustrative embodiment above, the emulation routine is described in terms of client threads for emulating client applications or client machines. The invention also encompasses any sort of requester of services whether it be a client in a client/server environment or a peer in a peer environment or other consumer application in a network centric environment. The use of client in the claims below is meant to encompass any requesting processes or system. Therefore, changes in form and detail may be made therein without departing from the spirit and scope of the invention as set forth in the accompanying claims.

I claim:

1. A method for simulating multiple clients on a single client workstation comprising the steps of:

providing a plurality of successive network requests at a client workstation;

sending each of the successive network requests to a first request queue at the client workstation;

successively sending each of the successive network requests in the first request queue by a first client thread to a server application on a server workstation coupled to the client workstation over a network;

sending each of the successive network requests to a second request queue at the client workstation; and successively sending each of the successive network requests in the second request queue by a second client thread to the server application, wherein the network requests when sent by the second client thread are timed to avoid resource conflicts with the network requests when sent by the first client thread.

2. The method as recited in claim 1 further comprising sending each of the successive network requests to a number of request queues ,each network request sent from a preceding request queue, and successively sending each of the successive network requests in the request queues by corresponding client threads to the server application, the number of request queues and client threads equal to a number of client workstations desired to be simulated wherein the timing of sending the network requests to the server application by the respective client threads is made to avoid conflicts between client threads.

3. The method as recited in claim 1 further comprising the step of intercepting the plurality of network requests generated from requests from a client application.

4. The method as recited in claim 1 wherein each client thread starts sending the successive network requests to the server application once a predetermined number of network requests are in a request queue which is used by the respective client thread.

5. The method as recited in claim 4 further comprising the step of adjusting the predetermined number of network requests needed in a request queue to start a client thread.

6. The method as recited in claim 1 wherein the providing step is accomplished by user interaction with a client application.

7. A method for simulating multiple users in a network environment by means of a multithreaded process in a client workstation comprising the steps of:

providing a plurality of client threads and associated request queues, each client thread simulating a user in the network environment;

providing a series of network requests to a first network request queue associated with a first client thread;

sequentially sending each of the series of network requests to a server in the network environment by the first client thread; and sequentially providing each respective network request of the series of network requests to a next network request queue by the first client thread substantially contemporaneously as the respective network request of the series of network requests is sent to the server;

wherein the sequentially sending and sequentially providing steps are repeated by successive threads in the plurality of client threads so that a plurality of users are simulated.

8. The method as recited in claim 7 wherein the step of providing a series of network requests further comprises the steps of:

receiving network traffic from a network application in the client workstation;

filtering the network traffic to assemble network requests and corresponding network responses; and enqueuing the assembled network requests and network responses in the first network request queue.

9. The method as recited in claim 7 further comprising the step of dynamically adjusting a depth of the network request queues to avoid conflicts between client threads when requests are made for network resources.

10. The method as recited in claim 9 wherein the depth of the network request queues is adjusted according to user input from a user interface.

11. A system including processor and memory for simulating multiple users in a network environment by means of a multithreaded process in a client workstation comprising:

a plurality of client threads and associated network request queues, each client thread simulating a user in the network environment;

means for providing a series of network requests to a first network request queue associated with a first client thread; and means for concurrently sending each network request to a server in the network environment and to a next network request queue by each of the client threads so that a plurality of users are simulated.

12. The system as recited in claim 11 further comprising:

means for receiving network traffic from a network application in the client workstation;

means for filtering the network traffic to assemble network requests and corresponding network responses; and means for enqueuing the assembled network requests and network responses in the first network request queue.

13. The system as recited in claim 12 further comprising a set of parameter tables associated with each client thread wherein the client threads store information from the network responses to replace information in the network requests from the network application with thread specific information before sending the network requests to the server.

14. The system as recited in claim 12 further comprising a trace facility for sending network traffic from the network application to the receiving means.

15. The system as recited in claim 11 further comprising a timer thread for flushing the network request queues when network traffic from the network application lapses.

16. A computer program product in a computer readable medium for simulating multiple users in a network environment from a client workstation comprising:

means for providing a plurality of client threads, each client thread simulating a user in the network environment;

means for providing a plurality of network request queues each associated with a respective client thread;

means for providing network requests to a first network request queue associated with a first client thread; and means for sequentially sending the network requests to a server in the network environment and to a next network request queue by each of the client threads so that a plurality of users are simulated wherein network requests sent by each of the client threads are timed to avoid resource conflicts between threads.

17. The product as recited in claim 16 further comprising:

means for receiving network traffic from a network application in the client workstation;

means for filtering the network traffic to assemble network requests and corresponding network responses; and means for enqueuing the assembled network requests and network responses in the first network request queue.

18. The product as recited in claim 17 further comprising means for providing a set of parameter tables associated with each client thread wherein the client threads store information from the network responses to replace information in the network requests from the network application with thread specific information before sending the network requests to the server.

19. The product as recited in claim 16 further comprising a timer thread for flushing the network request queues when network traffic from the network application lapses.

20. The product as recited in claim 16 wherein a depth of the network request queues is dynamically configurable at runtime.

21. The product as recited in claim 20 further comprising:

means for monitoring the network requests sent by at least one of the client threads; and means for dynamically configuring the depth of the network request queues based on the monitored network requests previously sent by the client thread and a current network request to avoid conflicts between client threads.

22. The product as recited in claim 16 further comprising:

means for providing a second plurality of client threads, each client thread simulating a user in the network environment;

means for providing a second plurality of network request queues each associated with a respective client thread;

means for determining whether a network request should be provided to the first or second plurality of client threads;

means for providing network requests to a second network request queue associated with a second client thread in the second plurality of client threads; and means for sequentially sending the network requests to a server in the network environment and to a next network request queue by each of the client threads in the second plurality of client threads so that a second plurality of users are simulated wherein network requests sent by each of the client threads in the second plurality are timed to avoid resource conflicts between client threads.

\* \* \* \* \*